(12) United States Patent
Fan et al.

(10) Patent No.: US 9,998,492 B2
(45) Date of Patent: Jun. 12, 2018

(54) PROCESSING METHOD FOR NETWORK ADDRESS TRANSLATION TECHNOLOGY, NAT DEVICE AND BNG DEVICE

(71) Applicant: ZTE Corporation, Shenzhen (CN)

(72) Inventors: Liang Fan, Shenzhen (CN); Bo Yuan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 89 days.

(21) Appl. No.: 14/442,549

(22) PCT Filed: Aug. 27, 2013

(86) PCT No.: PCT/CN2013/082397
§ 371 (c)(1),
(2) Date: May 13, 2015

(87) PCT Pub. No.: WO2014/075485
PCT Pub. Date: May 22, 2014

(65) Prior Publication Data
US 2016/0285908 A1 Sep. 29, 2016

(30) Foreign Application Priority Data
Nov. 14, 2012 (CN) .......................... 2012 1 0456758

(51) Int. Cl.
*G06F 7/04* (2006.01)
*G06F 15/16* (2006.01)
(Continued)

(52) U.S. Cl.
CPC ...... *H04L 63/1441* (2013.01); *H04L 12/2869* (2013.01); *H04L 61/2517* (2013.01);
(Continued)

(58) Field of Classification Search
CPC . H04L 63/14; H04L 63/1408; H04L 63/1425; H04L 63/1441; H04L 63/145;
(Continued)

(56) References Cited

U.S. PATENT DOCUMENTS 8,990,891 B1 * 3/2015 Chickering ............. G06F 21/74
726/1
9,313,687 B2 * 4/2016 Knutson ............. H04L 61/2038
(Continued)

FOREIGN PATENT DOCUMENTS

CN  1543115 A  11/2004
CN  101483515 A  7/2009

OTHER PUBLICATIONS

International Search Report for corresponding application PCT/CN2013/082397 filed Aug. 27, 2013; dated Nov. 28, 2013.
(Continued)

*Primary Examiner* — Trong Nguyen
(74) *Attorney, Agent, or Firm* — Cantor Colburn LLP (57) ABSTRACT

Provided are a processing method for a Network Address Translation, NAT, technology, an NAT device and a BNG device, the method includes: the NAT device determining whether or not session establishment of a UE reaches a preset threshold, and notifying the BNG device to execute a security strategy for the UE if the session establishment of the UE reaches the preset threshold, wherein the security strategy is used for stopping the attack behavior of the UE and informing the UE of the attack behavior of the UE. In the disclosure, the technical problem in the related art that the user lodges complaints against the operator for the abnormal behavior of the host user is solved, thus by reminding the user to check the security of the host user, the disclosure increases the utilization rate of the NAT device and improves user experience.

14 Claims, 7 Drawing Sheets

(51) Int. Cl.
  *G06F 17/30* (2006.01)
  *H04L 29/06* (2006.01)
  *H04L 29/12* (2006.01)
  *H04L 12/28* (2006.01)
  *H04W 12/12* (2009.01)
  *H04L 29/08* (2006.01)

(52) U.S. Cl.
  CPC ...... *H04L 61/2557* (2013.01); *H04L 63/0227* (2013.01); *H04L 63/0892* (2013.01); *H04L 63/10* (2013.01); *H04L 63/145* (2013.01); *H04L 63/1416* (2013.01); *H04L 63/1458* (2013.01); *H04L 67/02* (2013.01); *H04L 67/26* (2013.01); *H04W 12/12* (2013.01); *H04L 67/2814* (2013.01)

(58) Field of Classification Search
  CPC ............. H04L 63/1458; H04L 12/2869; H04L 61/2517; H04L 61/2557; H04L 63/0227; H04L 63/0892; H04L 63/10; H04L 63/1416; H04L 67/02; H04L 67/26; H04L 67/2814; H04W 12/12
  See application file for complete search history.

(56) References Cited

U.S. PATENT DOCUMENTS

| | | | |
|---|---|---|---|
| 2004/0047356 A1* | 3/2004 | Bauer | H04L 63/145 370/401 |
| 2004/0128539 A1 | 7/2004 | Shureih | |
| 2006/0206933 A1* | 9/2006 | Molen | H04L 63/0428 726/14 |
| 2008/0263358 A1* | 10/2008 | Alme | H04L 63/14 713/176 |
| 2010/0223661 A1 | 9/2010 | Yang | |
| 2012/0167217 A1* | 6/2012 | McReynolds | G06F 21/554 726/24 |

OTHER PUBLICATIONS

Brockners S. Bhandari, "Diameter Network Address and Port Translation Control Application", Oct. 25, 2012, pp. 1-58, XP015086457.
European Search Report for corresponding application EP13854514; Report dated Nov. 2, 2015.
Ford, "Issues with IP Address Sharing", ISOC, Jun. 28, 2011, pp. 1-29, XP015076052.
Perreault S., Common Requirements for Carrier Grade Nat (CGNs), Aug. 9, 2012, pp. 1017, XP015086794.

* cited by examiner

PROCESSING METHOD FOR NETWORK ADDRESS TRANSLATION TECHNOLOGY, NAT DEVICE AND BNG DEVICE

TECHNICAL FIELD

The disclosure relates to the communication field, and in particularly to a method, a Network Address Translation (NAT) device and a Broadband Network Gateway (BNG) device for processing a network address translation technology.

BACKGROUND

With the number of users using broadband accessing to a Internet soars continuously, address resources of a Internet Protocol Version 4 (IPv4) is being stretched, and IPv4 addresses of a public network which can be transmitted over the Internet becomes more and more scarce; apparently, the continuously decreasing IPv4 addresses of the public network cannot meet the demands of network users, as a result, the Network Address Translation (NAT) technology emerges.

The NAT technology, a technology of translating a IPv4 address of the private network to a IPv4 address of the public network, has been widely applied to various types of Internet access modes and various types of networks. The NAT technology can perfectly solve the problem of insufficient Internet Protocol (IP) addresses and effectively avoid an attack from the outside of the network, so as to hide and protect one or more computer in the network.

As a device for providing an NAT function, the NAT device is classified into two types:

(1) a converged NAT device is integrated with a Broadband Network Gateway (BNG) providing a broadband access service and the NAT function.

(2) a independent NAT device merely provides the NAT function. The independent NAT device is located at the upstream of the BNG and merely provides an NAT function but not broadband access function.

The process that a user accesses the Internet using the NAT function is as follows:

(1) when online, a broadband user acquires a IPv4 address of the private network from a broadband network gateway;

(2) when the broadband user accesses the Internet, the source address of one or more IPv4 packets of the broadband user is a acquired IPv4 address of the private network, and the one or more IPv4 packets are sent to the NAT device;

(3) the NAT device translates a source IP address and a source port of a user message to a IP address of the public network and a port of the public network according to a specific rule, generates a session correspondence relationship between 'the source IP address+the source port' and 'a translated source IP address+a translated source port', and sends the user message to the Internet, thereby completing a forward NAT;

(4) a IP message returned to the user over the Internet searches for the session correspondence relationship between addresses and ports of the public network, and, addresses and ports of the private network on the NAT device according to a destination address and a destination port of the IP message. The destination address and the destination port of the IP message are translated to the source IP of the private network of the user message and the source port of the private network of the user message, thereby realizing an inverse NAT;

(5) an inverse packet is sent to the host of the user by taking the IP address and the port of the private network of the user message as the destination.

Thus, during an NAT process, the NAT device generates the session correspondence relationship between 'the source IP address+the source port' and 'the translated source IP address+the translated source port' according to the user message accessing the Internet. The relationship is called Session, and a session item is generated in the NAT device every time when the user accesses an Internet service (identified as a destination IP address+a destination port). Each session item records the following content:

1) the destination IP address and the destination port of the Internet service;

2) the source IP address and the source port of the private network of the user and the source IP address and the source port of the public network obtained by the user from using NAT; and 3) a used protocol.

A session item is established by the NAT device as long as the five-element group (the source IP address, the source port, a protocol, the destination IP address and the destination port) of an IP message is different when a user of the private network accesses the Internet, the NAT device can perform a forward NAT or an inverse NAT according to the correspondence relationship between the public network and the private network in the session item, and the user cannot access the Internet before replacing the address and the port of the private network with the address and the port of the public network by perform the NAT.

The capacity of such one or more session items are limited by hardware resources on the NAT device, that is, the number of the session items supported by the NAT device is limited. Under this situation, a problem appears that when the host of a private network user is attacked by one or more viruses, the host of the private network user continuously sends one or more attack messages carrying a varying destination IP address and a varying destination port to the Internet at a high speed, for example, at such a high speed that the combinations of 1000 different destination IP addresses and destination ports are sent every second, as the five-element group of the one or more attack messages keep varying and are sent by the host of a legal user, the NAT device generates different sessions according to the one or more attack messages, as the one or more attack messages are sent at an extremely high speed, the sessions generated by the one or more attack messages occupy a great amount of session resources and may even exhaust all the session resources of a whole NAT device, which disenables the legal user to access the Internet legally.

Similarly, as the processing capacity of the NAT device to a new session is limited, the session of the legal user cannot be established when the session establishment speed of an attacking user is beyond the processing capacity of the NAT device, which also disenables the legal user to access the Internet.

There are three solutions provided to solve the problems above:

1) a aging time of an attacking session is set to accelerate the aging of an invalid session;

2) the number of the sessions available to each user is limited so that only the sessions of the user of a virus-attacked host are exhausted, causing no influence to other legal users;

3) a establishment speed of the new session of each user is limited so as to inhibit a high-speed attack behavior.

However, in the three solutions described above, after the sessions of a user are exhausted in the case of an attack behavior. Existing devices can only notify the operator of the exhaustion of the sessions by means of a network manager or a system log alarm while the broadband dial-up network connection of the user still works. Therefore, the user is unaware of the fact that the network cannot be accessed because the computer of the user is attacked by the one or more viruses and still lodges complaints against the operator, resulting in that the complaints lodged by the user for the abnormal behavior of the host of the user increase significantly.

No effective solutions have been proposed to solve at least one of the problems above.

SUMMARY

The embodiments of the disclosure provide a processing method for Network Address Translation technology, an NAT device and a BNG device, so as to at least solve the problem in the related art that a user lodges complaints against the operator for the abnormal behavior of the host of the user.

The processing method for the network address translation technology according to an embodiment of the disclosure includes:

an NAT device determining whether or not session establishment of a user equipment (UE) reaches a preset threshold, and notifying a Broadband Network Gateway (BNG) device to execute a security strategy for the UE if the session establishment of the UE reaches the preset threshold, wherein the security strategy is used for stopping the attack behavior of the UE and informing the UE of the attack behavior of the UE.

In an example embodiment, the process that the BNG device executing the foregoing security strategy for the UE includes: the BNG device executing a forced Web page pushing strategy for the UE to re-direct an HTTP request sent by the UE to a first prompt page, wherein the first prompt page is used for informing the UE of the existence of an attack behavior during access of the UE.

In an example embodiment, the process that the BNG device re-directing the HTTP request sent by the UE to the first prompt page includes: the BNG device re-directing the HTTP request sent by the UE to the first prompt page at preset interval.

In an example embodiment, the first prompt page is further used for reminding the UE to check or kill viruses and/or Trojans.

In an example embodiment, after the BNG device executing the security strategy for the UE, the processing method for the network address translation technology further includes: the NAT device notifying the BNG device to execute, aiming at the access behavior of the UE, an operation of forcing the UE to be offline or returning the UE to an unauthenticated state and notifying an Authentication, Authorization and Accounting (AAA) server to mark or set the UE as a user equipment having an attack behavior, wherein the first prompt page is further used for reminding the UE of being forced to be offline or returned to the unauthenticated state; the UE requesting to be online and/or to be authenticated again, the AAA server authenticating the UE, after the UE passes the authentication, the AAA server notifying the BNG device to execute a forced Web page pushing strategy for the UE to re-direct a page access request of the UE to a second prompt page, wherein the second prompt page is used for reminding that a reason why the UE was formerly forced to be offline or returned to an unauthenticated state is the attack behavior of the UE and, if the user equipment still has the attack behavior, the NAT device reminding the UE that the UE will be forced to be offline or returned to the unauthenticated state again and reminding the user equipment to check and kill viruses and/or Trojans.

In an example embodiment, the NAT device includes at least one of the followings: an NAT device integrated with the BNG device; and an NAT device arranged separated from the BNG device.

In an example embodiment, in the case where the NAT device is integrated with the BNG device, the NAT device notifying the BNG device to execute the security strategy for the UE in one of the following ways: the NAT device sending the identification information of the UE to a security strategy server, and the security strategy server notifying the BNG device to execute the security strategy for the UE; and the NAT device sending the identification information of the UE to the BNG device to notify the BNG device to execute the security strategy for the UE.

In an example embodiment, after the NAT device notifying the BNG device to execute the security strategy for the UE, the processing method for the network address translation further includes: if the NAT device determining that the session establishment of the UE fails to reach the preset threshold or the UE canceling the execution of the security strategy via a forcedly pushed Web page, the NAT device notifying the BNG device to cancel the execution of the security strategy for the UE In an example embodiment, in the case where the NAT device is integrated with the BNG device, the NAT device notifying the BNG device to cancel the execution of the security strategy for the UE in one of the following ways: the NAT device sending the identification information of the UE to the security strategy server, and the security strategy server notifying the BNG device to cancel the execution of the security strategy for the UE; and the NAT device sending the identification information of the UE to the BNG device to notify the BNG device to cancel the execution of the security strategy for the UE.

In an example embodiment, in the case where a forcedly pushed World Wide Web (Web) page is in a public network and the NAT device executes an operation of forcedly pushing the Web page aiming at the access behavior of the UE, a session established by the NAT device for the UE includes: a session established between the UE and an HTTP connection of the forcedly pushed the Web page.

In an example embodiment, a session for the NAT device to determine whether or not the session establishment of the UE reaches the preset threshold includes at least one of the followings: a session established by a Transmission Control Protocol (TCP) connection of the UE; a session established by an Internet Control Message Protocol (ICMP) connection of the UE; and a session established by a User Datagram Protocol (UDP) connection of the UE.

In an example embodiment, the preset threshold includes at least one of the followings: the total number of sessions established by the UE and the speed of the establishing sessions by the UE.

In an example embodiment, the method further includes: the NAT device accelerating aging of one and more sessions of the UE when the NAT device notifies the BNG device to execute the security strategy for the UE.

AN NAT device according to another embodiment of the disclosure includes: a determination component configured to determine whether or not the session establishment of a user equipment reaches a preset threshold; and a first notification component configured to notify a BNG device to execute a security strategy for the UE if the session establishment of the UE reaches the preset threshold, wherein the security strategy is used for stopping the attack behavior of the UE and informing the user equipment of the attack behavior of the UE.

In an example embodiment, the NAT device further includes: a second notification component configured to notify the BNG device to execute, aiming at the access behavior of the UE, an operation of forcing the UE to be offline or returning the UE to an unauthenticated state and notify an Authentication, Authorization and Accounting (AAA) server to mark or set the user equipment as a UE having an attack behavior, wherein the first prompt page is further used for reminding the UE of being forced to be offline or returned to an unauthenticated state; the UE requesting to be online and/or to be authenticated by the AAA server again, after the UE passes the authentication, the AAA server notifies the BNG device to execute a forced Web page pushing strategy for the UE to re-direct the page access request of the UE to a second prompt page, wherein the second prompt page is used for reminding the UE that a reason why the user equipment was formerly forced to be offline or returned to an unauthenticated state is the attack behavior of the UE, and if the UE still has the attack behavior, the UE will be forced to be offline or returned to an unauthenticated state again and remind the UE to check and kill viruses and/or Trojans.

In an example embodiment, the NAT device further includes: a third notification component configured to notify the BNG device to cancel the execution of the security strategy for the UE if it is determined that the session establishment of the UE fails to reach the preset threshold or the UE cancels the execution of the security strategy via a forcedly pushed Web page.

In an example embodiment, the NAT device further includes: a processing component configured to notify the BNG device to accelerate the aging of the session of the UE when execution the security strategy for the UE.

A Broadband Network Gateway (BNG) device according to another embodiment of the disclosure includes: a first receiving component configured to receive a first notification which is sent by an NAT device to indicate the execution of a security strategy for a UE, wherein when the session establishment of the UE reaches a preset threshold, the security strategy is used for stopping the attack behavior of the UE and informing the UE of the attack behavior of the UE; and a re-direct component configured to execute a forced Web page pushing strategy for the UE to re-direct an HTTP request sent by the UE to a first prompt page, wherein the first prompt page is used for reminding the UE of the existence of the attack behavior in the access of the UE.

In an example embodiment, the BNG device further includes: a second receiving component configured to receive a second notification which is sent by the NAT device to indicate the execution of an operation of forcing the UE to be offline or returning the UE to an unauthenticated state aiming at the access behavior of the UE; and a processing component configured to execute, aiming at the access behavior of the UE, an operation of forcing the UE to be offline or returning the UE to the unauthenticated state according to the second notification and notify an Authentication, Authorization and Accounting (AAA) server to mark or set the UE as a UE having an attack behavior, wherein the first prompt page is further used for reminding the UE of being forced to be offline or returned to the unauthenticated state so as to let the UE request to be online and/or to be authenticated again. The processing component further configured to execute a forced Web page pushing strategy for the UE to re-direct the page access request of the UE to a second prompt page after the UE passes the authentication performed by the AAA server notifies, wherein the second prompt page is used for reminding the UE that a reason why the UE was formerly forced to be offline or returned to an unauthenticated state is the attack behavior of the UE, and if the UE still has the attack behavior, reminding the UE of being forced to be offline or returned to the unauthenticated state again and reminding the UE to check and kill viruses and/or Trojans.

In the embodiments of the disclosure, the NAT device determines whether or not the session establishment of the UE reaches the preset threshold which refers to the number or the frequency of the session establishment. If the session establishment of the UE reaches the preset threshold, the NAT device notifies the BNG device to execute the security strategy for the UE, wherein the security strategy is used for stopping the attack behavior of the UE and notifying the UE about the attack behavior of the UE. It is realized that when the UE has the attack behavior, by the NAT device notifying the BNG device to execute the security strategy for the UE to stop the attack behavior of the UE and the NAT device reminding the UE of the attack behavior in order to remind the UE to check and kill potential viruses or Trojans, the complaints lodged by the user against the operator is avoided, and both the utilization rate of the NAT device and user experience are improved.

BRIEF DESCRIPTION OF THE DRAWINGS

The drawings illustrated here provided a further understanding of the disclosure and form a part of the present application, The exemplary embodiments and the description thereof are used to explain the disclosure without unduly limiting the scope of the disclosure, wherein.

DETAILED DESCRIPTION OF THE EMBODIMENTS

The disclosure will be described hereinafter in detail with reference to the drawings and in conjunction with the embodiments. It needs to be noted that the embodiments of the present application and the features in the embodiments can be combined with each other if no conflict exists.

Figure 1:
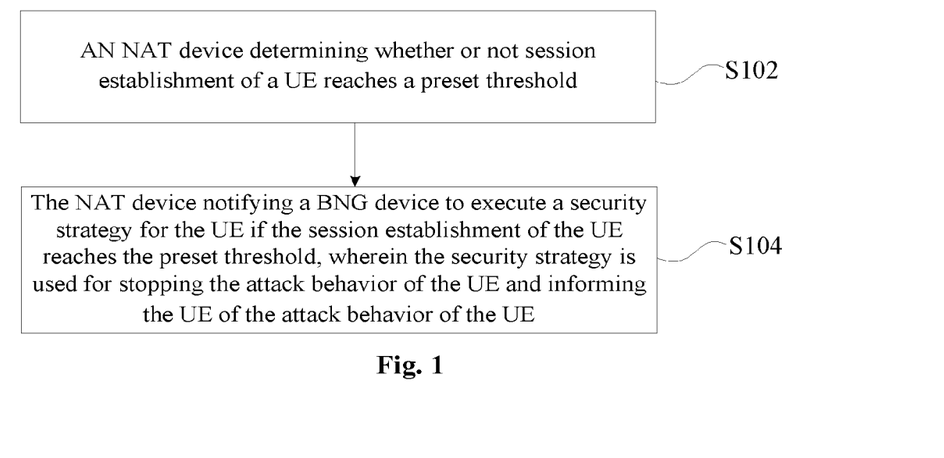
FIG. 1 is a flowchart of a processing method for a network address translation technology according to an embodiment of the disclosure.

A processing method for a network address conversion technology is provided according to an embodiment of the disclosure, and as shown in FIG. 1, the processing method for the network address technology includes step S102-step S104:

Step S102: an NAT device determines whether or not session establishment of a UE reaches a preset threshold;

Step S104: if the session establishment of the UE reaches the preset threshold, the NAT device notifies a BNG device to execute a security strategy for the UE, wherein the security strategy is used for stopping the attack behavior of the UE and informing the UE of the attack behavior of the UE.

With the above-mentioned processing steps, the NAT device determines whether or not session establishment of the UE reaches the preset threshold which refers to the number or the frequency of the session establishment, if the UE reaches the preset threshold, the NAT device notifies the BNG device to execute the security strategy for the UE, wherein the security strategy is used for stopping the attack behavior of the UE and informing the UE of the attack behavior of the UE. It is realized that when the UE has the attack behavior, by the BNG device executing the security strategy to stop the attack behavior of the UE and the NAT device informing the UE of the attack behavior of the UE and reminding the UE to check and kill potential viruses or Trojans, the complaints lodged by the user against the operator is avoided and both the utilization rate of the NAT device and user experience are improved.

To make the security strategy executed conveniently, in an example embodiment of the disclosure, the BNG device executes the security strategy for the UE includes: the BNG device executes a forced Web page pushing strategy for the UE to re-direct an HTTP request sent by the UE to a first prompt page, wherein the first prompt page is used for reminding the UE about the existence of the attack behavior in the access of the UE.

To increase the utilization rate of the BNG device, in an example embodiment of the disclosure, the BNG device re-directs an HTTP request sent by the UE to the first prompt page includes: the BNG device re-directs the HTTP request sent by the UE to the first prompt page every a preset period. That is, the BNG device can intercept each HTTP request message of the UE and re-direct the each HTTP request message to the first prompt page, or the BNG device intercepts the HTTP request message of the UE every a preset period and re-directs the HTTP request message to the first prompt page.

To enable the UE to terminate the attack behavior quickly, in an example embodiment, the first prompt page is further used for reminding the UE to check or kill viruses and/or Trojans.

To stop the attack behavior of the UE effectively, in an example embodiment, after the BNG device executes the security strategy for the UE, the processing method for the network address translation technology further includes: the NAT device notifies the BNG device to execute, aiming at the access behavior of the UE, an operation of forcing the UE to be offline or returning the UE to an unauthenticated state and notifies an AAA server to mark or set the UE as a UE having the attack behavior, wherein the first prompt page is further used for reminding the UE of being forced to be offline or returned to an unauthenticated state. The UE requests to be online and/or to be authenticated again. After the UE passes the authentication executed by the AAA server, the AAA server notifies the BNG device to execute a forced Web page pushing strategy for the UE to re-direct the page access request of the UE to a second prompt page, wherein the second prompt page is used for reminding the UE that a reason why the UE was formerly forced to be offline or returned to the unauthenticated state is the attack behavior of the UE, and if the UE still has the attack behavior, the NAT device reminds the UE of being forced to be offline or returned to an unauthenticated state again and reminds the UE to check and kill viruses and/or Trojans.

In an example embodiment, the NAT device may include at least one of the followings: an NAT device integrated with the BNG device; and an NAT device arranged separated from the BNG device.

Figure 2:
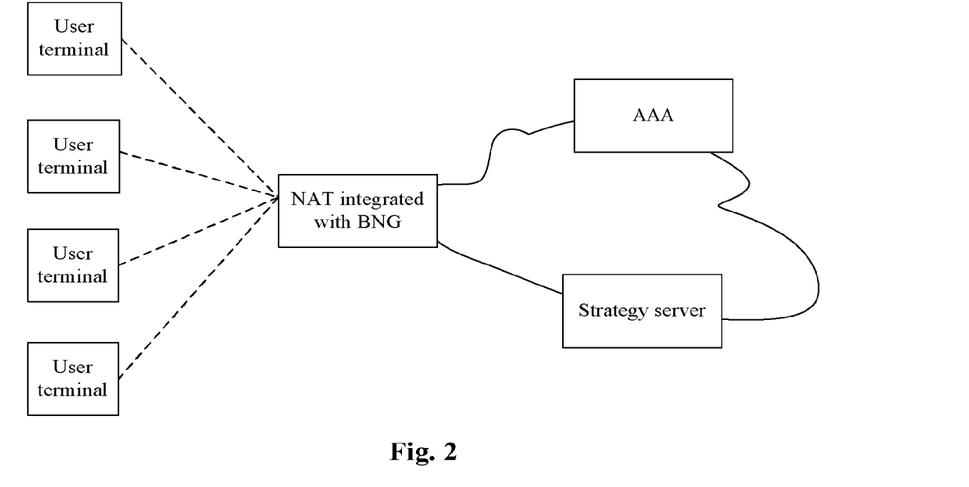
FIG. 2 is a first schematic diagram of a network architecture according to an embodiment of the disclosure.

In an example embodiment, in the case where the NAT device is integrated with the BNG device, a network architecture for realizing the above-mentioned processing method for the network address translation technology may be as shown in FIG. 2, and the NAT device may notify the BNG device to perform the security strategy for the UE in one of the following ways: the NAT device sends the identification information (e.g. the public network IP address and the public network port range of the UE resulting from a translation) of the UE to the security strategy server, and the security strategy server notifies the BNG device to execute the security strategy for the UE; and the NAT device sends the identification information of the UE to the BNG device to notify the BNG device to execute the security strategy for the UE.

Figure 3:
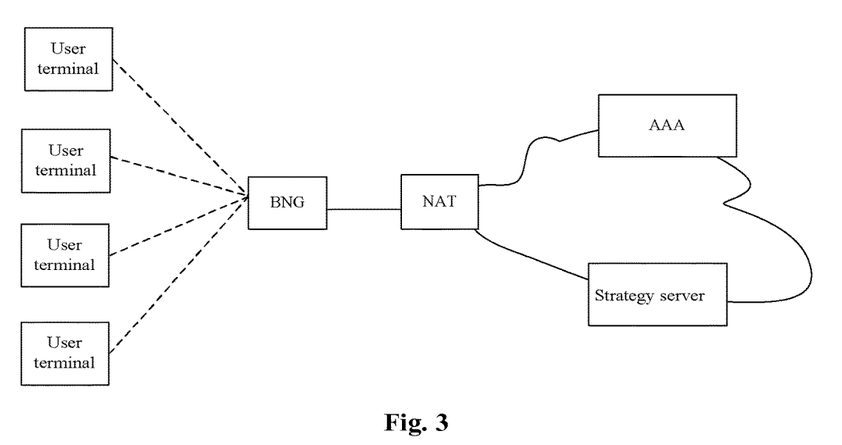
FIG. 3 is a second schematic diagram of the network architecture according to an embodiment of the disclosure.
Figure 4:
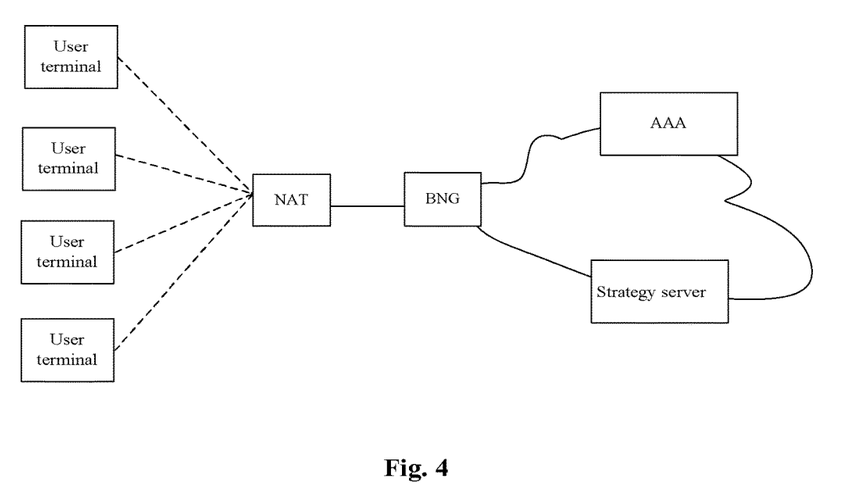
FIG. 4 is a third schematic diagram of the network architecture according to an embodiment of the disclosure.

In an example embodiment, when the NAT device is an NAT device arranged separated from the BNG device, the network architecture for realizing the above-mentioned processing method for the network address translation technology may be as shown in FIG. 3 or 4.

In order to meet the demands of the different application scenarios, in an example embodiment, after the NAT device notifies the BNG device to execute the security strategy for the UE, the processing method for the network address translation technology further includes: if the NAT device determines that session establishment of the UE fails to reach the preset threshold or that the UE cancels the execution of the security strategy via a forcedly pushed Web page, the NAT device notifies the BNG device to cancel the execution of the security strategy for the UE.

In an example embodiment, in the case where the NAT device is integrated with the BNG device, the NAT device may notify the BNG device to cancel the execution of the security strategy for the UE in one of the following ways: the NAT device sends the identification information of the UE to the security strategy server, and the security strategy server notifies the BNG device to cancel the execution of the security strategy for the UE; and the NAT device sends the identification information of the UE to the BNG device to notify the BNG device to cancel the execution of the security strategy for the UE.

In an example embodiment, the UE cancels the execution of the security strategy via the forcedly pushed Web page may include: a Web server sends a user strategy to the NAT device through the security strategy server to cancel the execution of the security strategy; or the Web server notifies the NAT device to distribute the user strategy to cancel the execution of the security strategy.

In an example embodiment, in the case where the forcedly pushed Web page is in a public network and the NAT device executes an operation of forcedly pushing a Web page aiming at the access behavior of the UE, the session established by the NAT device for the UE may include: a session established between the UE and the HTTP connection forcedly pushing the Web page.

To accurately determine whether or not the session establishment of the UE reaches the preset threshold, in an example embodiment, the session for the NAT device to determine whether or not the session establishment of the UE reaches the preset threshold may include at least one of the followings: the session established by the TCP connection of the UE; the session established by the ICMP connection of the UE; and the session established by the UDP connection of the UE.

In an example embodiment, the preset threshold includes at least one of the followings: the total number of the sessions established by the UE, the speed of the sessions established by the UE.

To shorten the aging time of the session of the user and release session resource timely, in an example embodiment, the method further includes: when notifying the BNG device to execute the security strategy for the UE, the NAT device accelerates the aging of the session of the UE.

In an example embodiment, in order to flexibly and timely prompt the UE that the UE has an attack behavior, the NAT device notifies the strategy server of the identification information (e.g. the attacking IP) of the UE while executing a user security strategy, and then through the third-party interface of the strategy server, the NAT device notifies the UE about the attack behavior of the UE in other ways, for example, by sending a short message to the UE, making a call to the UE or using other IM tools.

Figure 5:
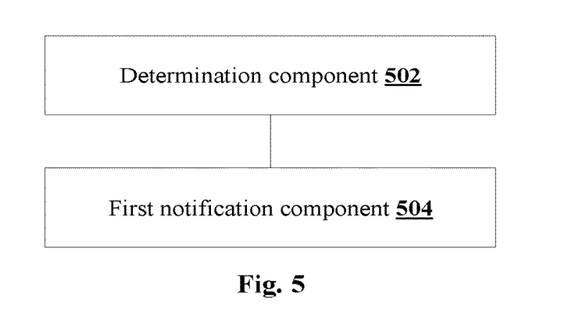
FIG. 5 is a structural diagram of an NAT device according to an embodiment of the disclosure.

AN NAT device is provided according to an example embodiment, as shown in FIG. 5, the NAT device includes: a determination component 502 configured to determine whether or not the session establishment of a UE reaches a preset threshold; and a first notification component 504 connected to the determination component 502 and configured to notify a BNG device to execute a security strategy for the UE if the session establishment of the UE reaches the preset threshold, wherein the security strategy is used for stopping the attack behavior of the UE and notifying the UE about the attack behavior of the UE.

In an example embodiment, the determination component 502 determines whether or not the session establishment of the UE reaches the preset threshold, wherein the preset threshold refers to the number of the session established by the UE or the frequency of the session established by the UE, and if the session establishment of the UE reaches the preset threshold, the first notification component 504 notifies the BNG device to execute a security strategy for the UE, wherein the security strategy is used for stopping the attack behavior of the UE and notifying the UE about the attack behavior of the UE. Thus, when the UE has the attack behavior, by the BNG device executing the security strategy to stop the attack behavior and the NAT device reminding the UE of the attack behavior and reminding the UE to check and kill potential viruses or Trojans, the complaints lodged by the user against the operator is avoided and both the utilization rate of the NAT device and user experience are improved.

To effectively stop the attack behavior of the UE, in an example embodiment, the NAT device further includes: a second notification component configured to notify the BNG device to execute, aiming at the access behavior of the UE, an operation of forcing the UE to be offline or returning the UE to an unauthenticated state and notify an AAA server to mark or set the UE as a UE having the attack behavior, wherein the first prompt page is further used to remind the UE of being forced to be offline or returned to an unauthenticated state. The UE requests to be online and/or to be authenticated again. After the UE passes the authentication executed by the AAA server, the AAA server notifies the BNG device to execute a forced Web page pushing strategy for the UE to re-direct the page access request of the UE to a second prompt page, wherein the second prompt page is used for reminding the UE that a reason why the UE was formerly forced to be offline or returned to an unauthenticated state is the attack behavior of the UE, and if the UE still has the attack behavior, the NAT device reminds the UE of being forced to be offline or returned to the unauthenticated state again and reminds the UE to check and kill viruses and/or Trojans.

In an example embodiment, in the case where the NAT device is integrated with the BNG device, the first notification component 504 includes: a first sending unit configured to send the identification information (e.g. the public network IP and the pubic network port range of the UE resulting from a translation) of the UE to a security strategy server, and the security strategy server notifies the BNG device to execute the security strategy for the UE; and/or a second sending unit configured to send the identification information of the UE to the BNG device to notify the BNG device to execute the security strategy for the UE.

In an example embodiment, in order to meet the demands of different application scenarios, the NAT device further includes: a third notification component configured to notify the BNG device to cancel the execution of the security strategy for the UE if it is determined that the session establishment of the UE fails to reach the preset threshold or that the UE cancels the execution of the security strategy via a forcedly pushed Web page.

In an example embodiment, in the case where the NAT device is integrated with the BNG device, the third notification component includes: a third sending unit configured to send the identification information of the UE to the security strategy server, and the security strategy server notifies the BNG device to cancel the execution of the security strategy for the UE; and/or a fourth sending unit configured to send the identification information of the UE to the BNG device to notify the BNG device to cancel the execution of the security strategy for the UE.

In an example embodiment, in order to shorten the aging time of the session of the user and release session resource timely, the NAT device further includes: a processing component configured to notify the BNG device to accelerate the aging of the session of the UE when the BNG device is executing the security strategy for the UE.

Figure 6:
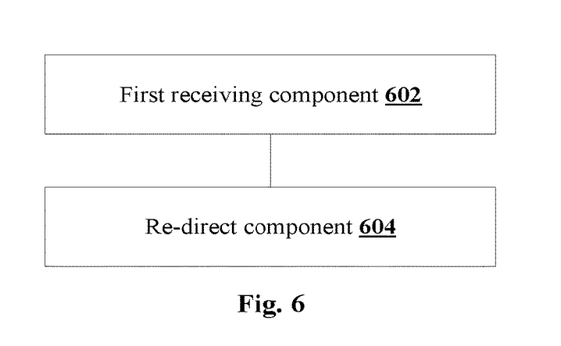
FIG. 6 is a structural diagram of a BNG device according to an embodiment of the disclosure.

A BNG device is provided according to an example embodiment. As shown in FIG. 6, the BNG device includes:

a first receiving component 602 configured to receive a first notification which is sent by an NAT device to indicate the execution of a security strategy for the UE, wherein when the session establishment of the UE reaches a preset threshold, the security strategy is used for stopping the attack behavior of the UE and notifying the UE about the attack behavior of the UE; and a re-direct component 604 connected to the first receiving component 602 and configured to execute a forced Web page pushing strategy for the UE to re-direct an HTTP request sent by the UE to a first prompt page, wherein the first prompt page is used for reminding the UE of the existence of the attack behavior in the access of the UE.

In an example embodiment, in order to increase the utilization rate of the BNG device, the re-direct component 604 is configured to re-direct the HTTP request sent by the UE to the first prompt page every a preset period. That is, the BNG device can intercept each HTTP request message of the UE and re-direct the each HTTP request message to the first prompt page, or the BNG device intercepts the HTTP request message of the UE every a preset period and re-directs the HTTP request message to the first prompt page.

In an example embodiment, in order to effectively stop the attack behavior of the UE, the BNG device further includes: a second receiving component configured to receive a second notification which is sent by the NAT device to indicate the execution of an operation of forcing the UE to be offline or returning the UE to an unauthenticated state aiming at the access behavior of the UE; and a processing component connected to the second receiving component and configured to execute, aiming at the access behavior of the UE, an operation of forcing the UE to be offline or returning the UE to the unauthenticated state according to the second notification and notify an AAA server to mark or set the UE as a UE having the attack behavior, wherein the first prompt page is further used to remind the UE of being forced to be offline or returned to the unauthenticated state, so as to let the UE request to be online and/or to be authenticated again. The processing component further configured to execute a forced Web page pushing strategy for the UE to re-direct the page access request of the UE to a second prompt page when the BNG device is notified by the AAA server after the UE passes the authentication executed by the AAA server, wherein the second prompt page is used for reminding the UE that a reason why the UE was formerly forced to be offline or returned to the unauthenticated state is the attack behavior of the UE, and reminding the UE that of being forced to be offline or returned to an unauthenticated state again if the UE still has the attack behavior, and reminding the UE to check and kill viruses and/or Trojans.

In an example embodiment, the UE is any one of the followings: a UE using a Point-to-Point Protocol over Ethernet (PPPoE), a UE using Internet Protocol over Ethernet (IPoE) and a UE on a mobile Internet.

Each of the above-mentioned embodiments is described below in detail with reference to accompanying drawings.

Figure 7:
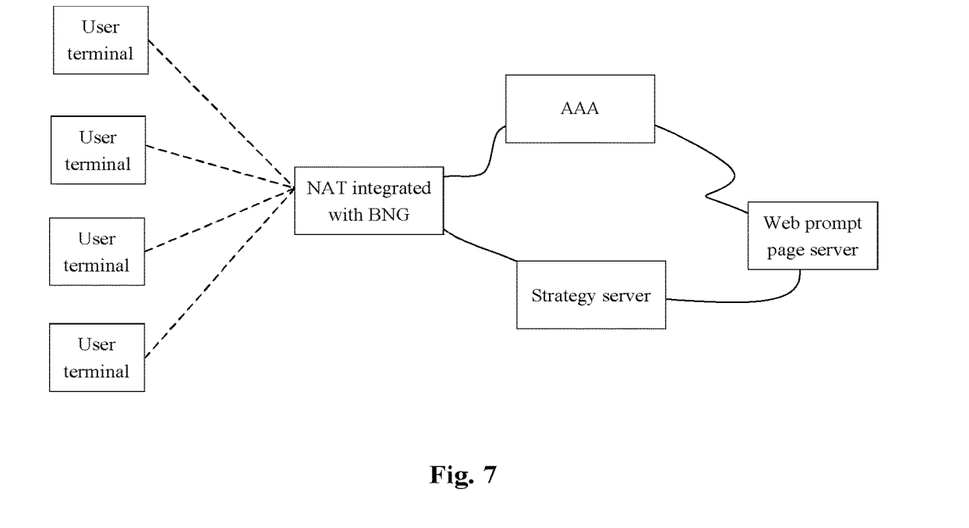
FIG. 7 is a first schematic diagram of a network according to an embodiment of the disclosure.
Figure 8:
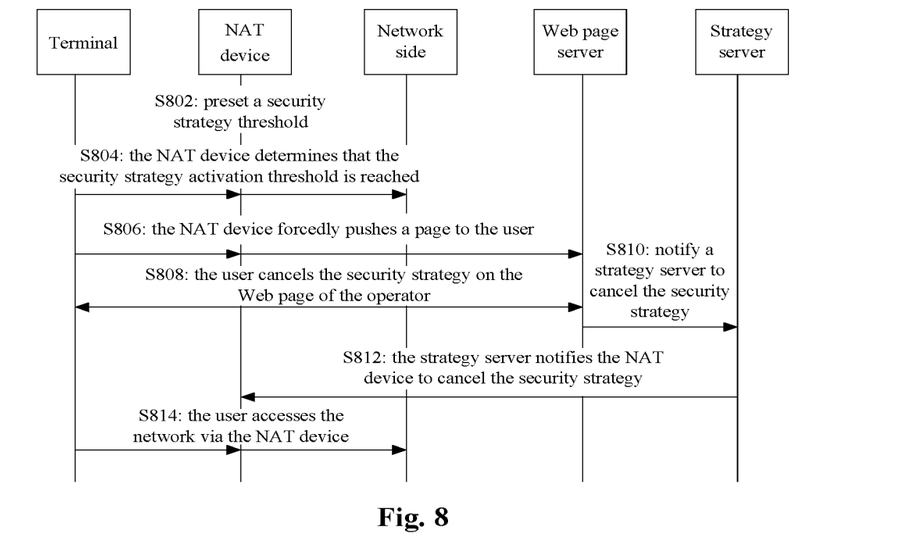
FIG. 8 is a flowchart diagram of a processing method for the network address translation technology according to an embodiment of the disclosure.

In an example embodiment, by taking a network scenario as shown in FIG. 7 for example, the NAT device is a converged NAT device, a Web page is always forcedly pushed when the number of the sessions consumed by the TCP attack of an NAT user reaches a security strategy activation threshold (equivalent to the preset threshold) so that the user initiatively cancels the security strategy via the Web page, and based on the network scenario, the flowchart of a processing method for the network address translation technology, as shown in FIG. 8, includes the following steps:

step S802: the NAT device presets the security strategy activation threshold to be 80% of the maximum allowable session number of the user;

step S804: the NAT device determines that the security strategy activation threshold is reached when the user has a TCP attack behavior;

step S806: the NAT device distributes a forced push mark to the user and then intercepts all the TCP connections of the user to port 80 and re-directs all the HTTP accesses of the user to the Web prompt page (equivalent to the first prompt page) of the operator through an HTTP re-direct mark to remind the user to check and kill potential viruses and Trojans, meanwhile, the NAT device dynamically accelerates the aging of an invalid session of the user.

step S808: after checking and killing viruses and Trojans, the user requests to cancel the security strategy on the Web page of the operator;

step S810: the Web server of the operator notifies a strategy server to notify the NAT device to cancel the security strategy;

step S812: the strategy server notifies the NAT device to cancel the security strategy; and step S814: the user accesses the network via the NAT device.

Figure 9:
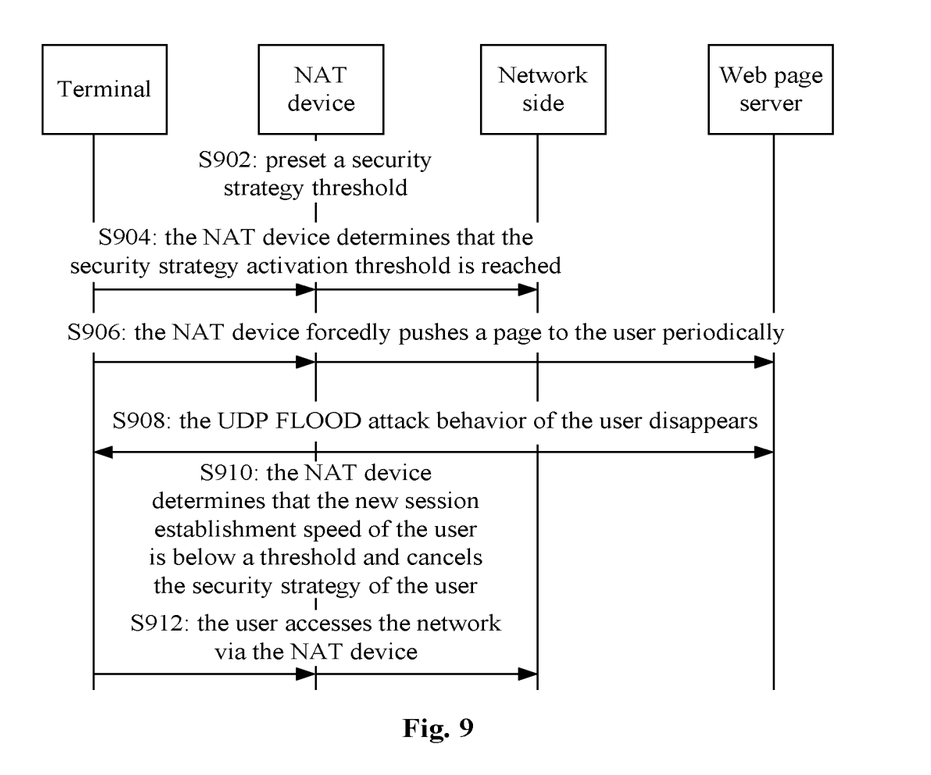
FIG. 9 is a flowchart diagram of a processing method for the network address translation technology according to another embodiment of the disclosure.

In an example embodiment, by taking the network scenario as shown in FIG. 7 for example, the NAT device is a converged NAT device, a Web page is forcedly pushed periodically when the sessions consumed by the UDP attack of an NAT user reaches a security strategy activation threshold (equivalent to the foregoing preset threshold) so that the NAT device initiatively cancels the security strategy after the attack behavior of the user is terminated, and based on the network scenario, the flowchart of a processing method for the network address translation technology, as shown in FIG. 9, includes the following steps:

step S902: the NAT device presets the security strategy activation threshold to be 80% of the maximum allowable new session establishment speed of the user;

step S904: the NAT device determines that the security strategy activation threshold is reached when the user has a UDP FLOOD attack behavior;

step S906: the NAT device sets a forced push mark for the user and sequentially intercepts the TCP connection of the user to port 80 and periodically re-directs the HTTP access request of the user to the Web prompt page of the operator via an HTTP re-direct mark; a part of the HTTP requests of the user for requesting for the access to a webpage are periodically re-directed to the Web prompt page of the operator to remind the user to check and kill potential viruses and Trojans;

step S908: the UDP FLOOD attack behavior of the user disappears after the user terminal checks and kills viruses and Trojans;

step S910: the NAT device determines that the new session establishment speed of the user is below the threshold and cancels the security strategy of the user; and step S912: the user accesses the network via the NAT device.

Figure 10:
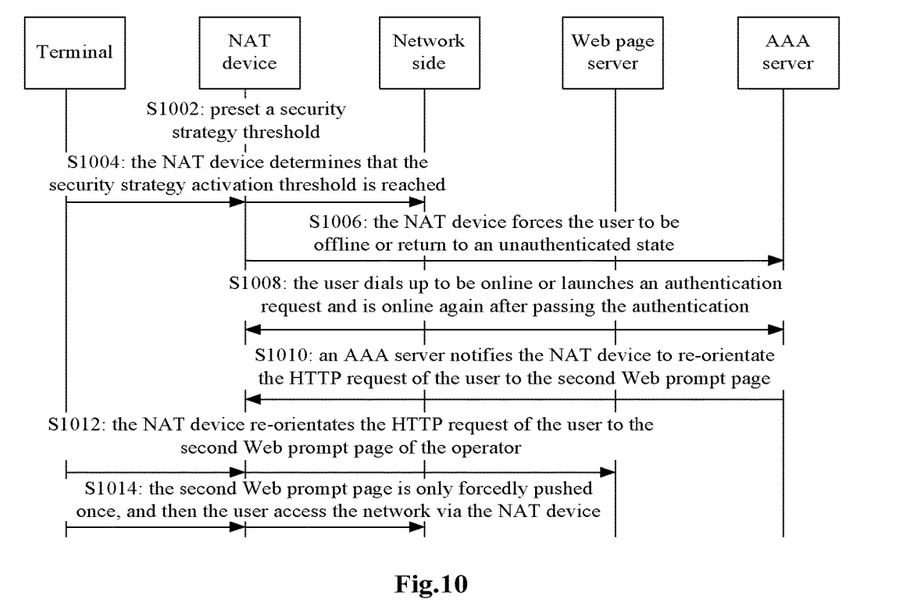
FIG. 10 is a flowchart diagram of a processing method for the network address translation technology according to another embodiment of the disclosure.

In an example embodiment, by taking the network scenario as shown in FIG. 7 for example, the NAT device is a converged NAT device, a Web page is forcedly pushed and the user is forced to be offline when the number of the sessions consumed by the TCP attack of an NAT user reaches a security strategy activation threshold (equivalent to the foregoing preset threshold), and the flowchart of a processing method for the network address translation technology, as shown in FIG. 10, includes the following steps:

step S1002: the NAT device presets the security strategy activation threshold to be 80% of the maximum allowable session number of the user;

step S1004: the NAT device determines that the security strategy activation threshold is reached when the user has a TCP attack behavior;

step S1006: the NAT device forces the user to be offline or return to an unauthenticated state and notifies an authentication server that the user is offline because of an NAT session attack;

Optionally, before forcing the user to be offline or return to an unauthenticated state, the NAT device forcedly pushes a Web page to remind the user of being offline or returned to the unauthenticated state and being online or authenticated again after checking or killing potential viruses or Trojans;

step S1008: the user dials up to be online or launches an authentication request and is online again after passing the authentication;

step S1010: an AAA server notifies the NAT device to re-direct the HTTP request of the user to the second Web prompt page (equivalent to the second prompt page) of the operator;

step S1012: the NAT device re-directs the HTTP request of the user to the second Web prompt page of the operator to remind the user of the reason for the former offline and remind the user to check and kill potential viruses and Trojans; and step S1014: the second Web prompt page is only forcedly pushed once, and then the user access the network via the NAT device.

If the virus or Trojan check and killing operation is not implemented or not thoroughly implemented by the user, then the attack behavior still occurs, and the user is forced to be offline again when the number of the sessions of the user reaches the security strategy activation threshold again.

If the user successfully checks and kills viruses and Trojans, the attack behavior is terminated, and the user can continue to access the network via the NAT device.

Figure 11:
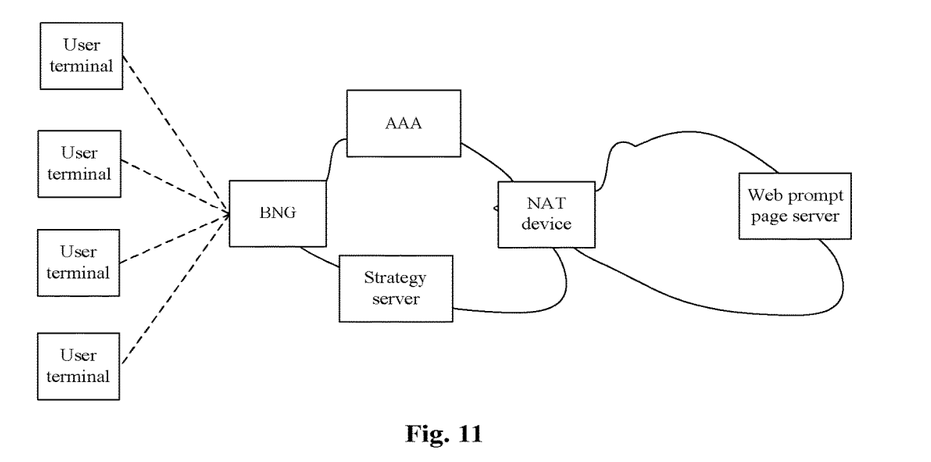
FIG. 11 is a second schematic diagram of the network according to an embodiment of the disclosure.
Figure 12:
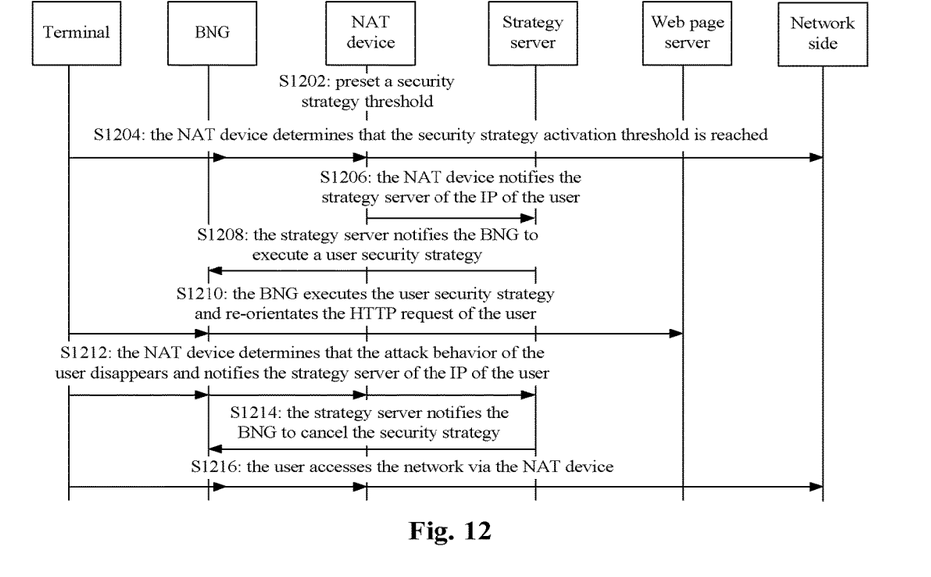
FIG. 12 is a flowchart diagram of a processing method for the network address translation technology according to another embodiment of the disclosure.

In an example embodiment, by taking the network scenario as shown in FIG. 11 for example, the NAT device is an independent NAT device or an Address Family Transition Router (AFTR), a strategy server notifies a BNG to execute a user security strategy when the number of the sessions consumed by the TCP attack of an NAT user reaches a security strategy activation threshold (equivalent to the foregoing preset threshold), and the flowchart of a processing method for the network address translation technology, as shown in FIG. 12, includes the following steps:

step S1202: the NAT device presets the security strategy activation threshold to be 80% of the maximum allowable session number of the user;

step S1204: the NAT device determines that the security strategy activation threshold is reached when the user has a TCP attack behavior;

step S1206: the NAT device notifies the strategy server of the IP of the user;

step S1208: the strategy server notifies the BNG to execute a user security strategy;

step S1210: the BNG executes the user security strategy and re-directs the HTTP request of the user to remind the user to check and kill potential viruses and Trojans;

step S1212: after the user terminal checks and kills viruses and Trojans, the UDP FLOOD attack behavior of the user disappears; and the NAT device determines that the attack behavior of the user disappears and notifies the strategy server of the IP of the user;

step S1214: the strategy server notifies the BNG to cancel the security strategy; and step S1216: the user accesses the network via the NAT device.

Figure 13:
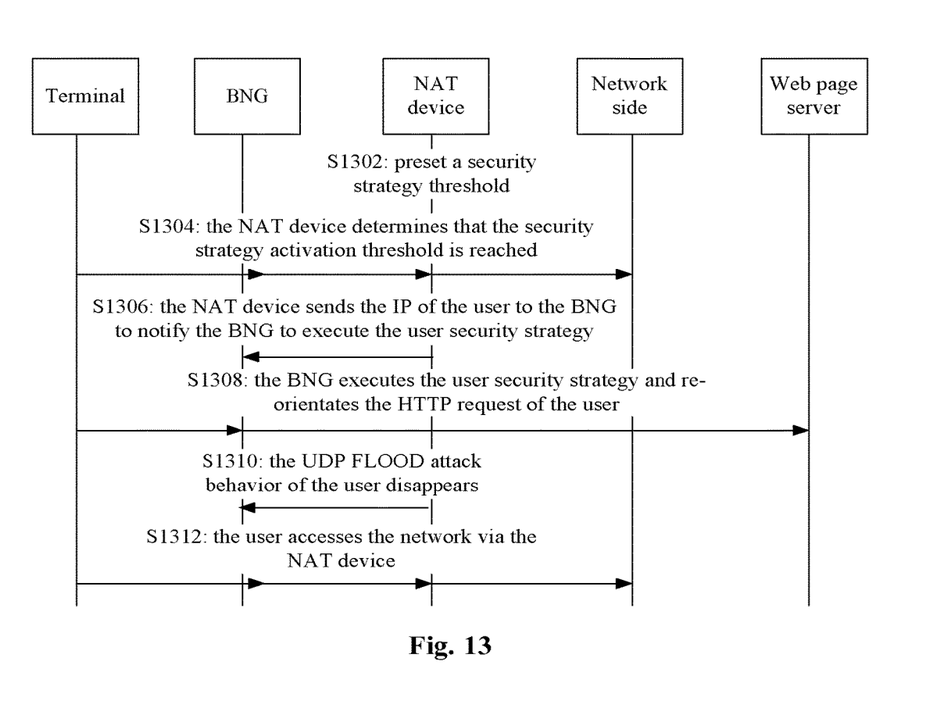
FIG. 13 is a flowchart diagram of a processing method for the network address translation technology according to another embodiment of the disclosure.

In an example embodiment, by taking the network scenario as shown in FIG. 11 for example the NAT device is an independent NAT device or an AFTR, a BNG is notified to execute a user security strategy when the number of the sessions consumed by the TCP attack of an NAT user reaches a security strategy activation threshold (equivalent to the foregoing preset threshold), and the flowchart of a processing method for the network address translation technology, as shown in FIG. 13, includes the following steps:

step S1302: the NAT device presets the security strategy activation threshold to be 80% of the maximum allowable new session establishment speed of the user;

step S1304: the NAT device determines that the security strategy activation threshold is reached when the user has a TCP attack behavior;

step S1306: the NAT device sends the IP of the user to the BNG to notify the BNG to execute the user security strategy;

step S1308: the BNG executes the user security strategy and re-directs the HTTP request of the user to remind the user to check and kill potential viruses and Trojans;

step S1310: after the user terminal checks and kills viruses and Trojans, the UDP FLOOD attack behavior of the user disappears; and the NAT device determines that the attack behavior of the user disappears and sends the IP of the user to the BNG to notify the BNG to cancel the security strategy; and step S1312: the user accesses the network via the NAT device.

Figure 14:
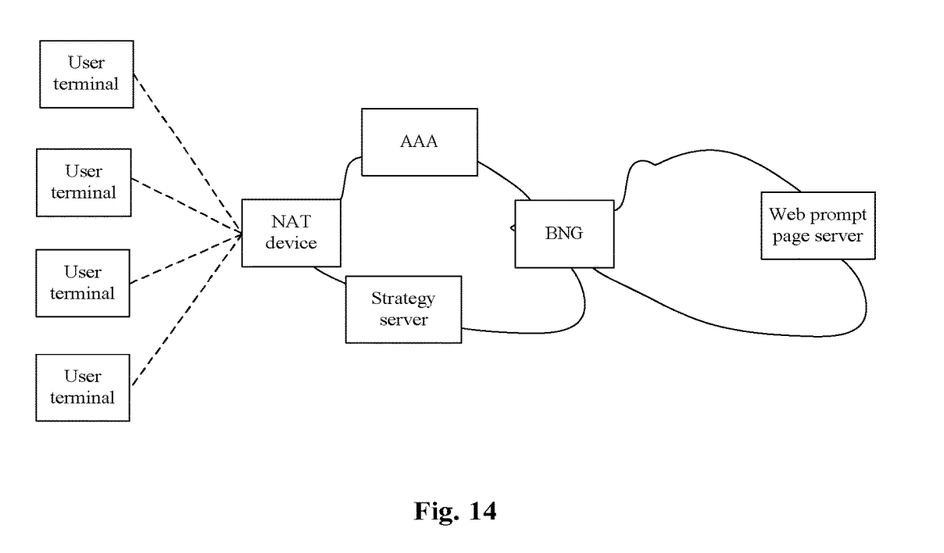
FIG. 14 is a third schematic diagram of the network according to an embodiment of the disclosure.
Figure 15:
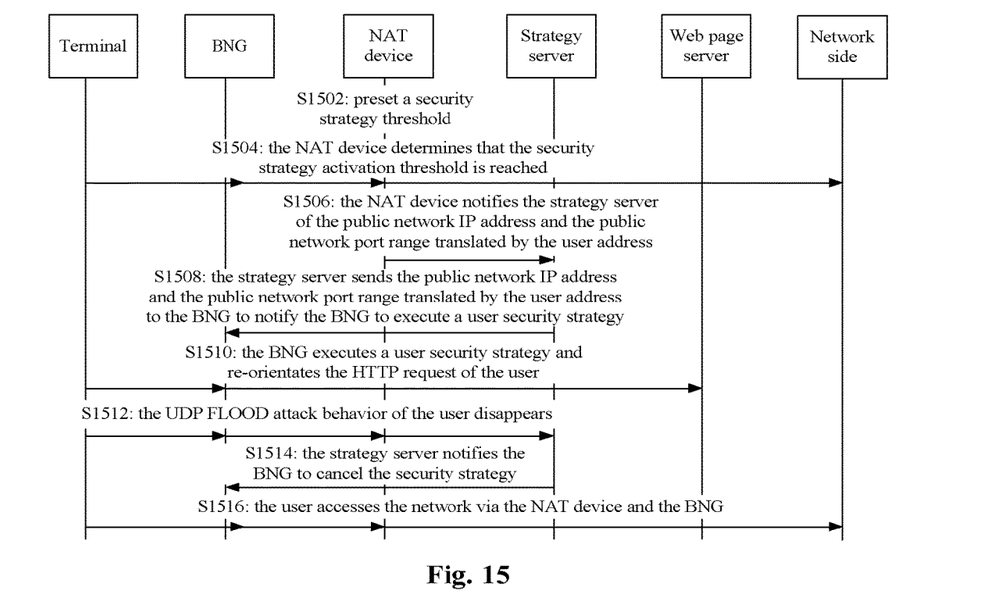
FIG. 15 is a flowchart diagram of a processing method for the network address translation technology according to another embodiment of the disclosure.

In an example embodiment, by taking the network scenario as shown in FIG. 14 for example the foregoing NAT device is an independent NAT device or integrated with an AC, a strategy server notifies a BNG to execute a user security strategy when the number of the sessions consumed by the TCP attack of an NAT user reaches a security strategy activation threshold (equivalent to the foregoing preset threshold), and the flowchart of a processing method for the network address translation technology, as shown in FIG. 15, includes the following steps:

step S1502: the NAT device presets the security strategy activation threshold to be 80% of the maximum allowable session number of the user and assigns a public network address and a public network port range translated by a user address to the private network address of the user;

step S1504: the NAT device determines that the security strategy activation threshold is reached when the user has a TCP attack behavior;

step S1506: the NAT device notifies the strategy server of the public network IP address and the public network port range translated by the user address;

step S1508: the strategy server sends the public network IP address and the public network port range translated by the user address to the BNG to notify the BNG to execute a user security strategy;

step S1510: the BNG executes a user security strategy and re-directs the HTTP request of the user to remind the user to check and kill potential viruses and Trojans;

step S1512: after the user terminal checks and kills viruses and Trojans, the UDP FLOOD attack behavior of the user disappears; and the NAT device determines that the attack behavior of the user disappears and notifies the strategy server of the IP of the user;

step S1514: the strategy server notifies the BNG to cancel the security strategy; and step S1516: the user accesses the network via the NAT device and the BNG It can be seen from above-mentioned that the example embodiments realize the following technical effect that, by means of the NAT device which determines whether or not the session establishment of the UE reaches the preset threshold which refers to the number of the session established by the UE or the frequency of the session established by the UE, the NAT device notifies the BNG device to execute a security strategy for the UE if the session establishment of the UE reaches the preset threshold, wherein the security strategy is used for stopping the attack behavior of the UE and notifying the UE about the attack behavior of the UE When the UE has the attack behavior, by the BNG device executing the security strategy to stop the attack behavior, the NAT device reminding the UE of the attack behavior and reminding to check and kill potential viruses or Trojans, the complaints lodged by the user against the operator is avoided and both the utilization rate of the NAT device and user experience are improved.

Obviously, those skilled in the art shall understand that the above-mentioned components and steps of the disclosure can be realized by using general purpose calculating device, can be integrated in one calculating device or distributed on a network which consists of a plurality of calculating devices. Alternatively the components and the steps of the disclosure can be realized by using the executeable program code of the calculating device. Consequently they can be stored in the storing device and executed by the calculating device, or they are made into integrated circuit component respectively, or a plurality of components or steps thereof are made into one integrated circuit component. In the way, the disclosure is not restricted to any particular hardware and software combination.

Above description is only to illustrate the preferred embodiments but not to limit the disclosure. Various alterations and changes to the disclosure are apparent to those skilled in the art. The protective scope defined in the disclosure shall comprise any modification, equivalent substitution and improvement within the spirit and principle of the disclosure.

INDUSTRIAL APPLICABILITY

The technical solution provided herein can be applied to the field of the network address translation to solve the problem that the user lodges complaints against the operator because of the abnormal behavior of his/her own host, stop the attack behavior of a UE by executing a security strategy when the UE has the attack behavior, remind the UE of its own attack behavior and remind the user to check and kill potential viruses and Trojans and consequentially avoids the complaints lodged by the user against the operator and improves the utilization rate of an NAT device.

What is claimed is:

1. A processing method for a Network Address Translation (NAT), the method comprising:
   determining, by an NAT device, whether or not a session establishment of a user equipment (UE) reaches a preset threshold;
   notifying, by the NAT device, a Broadband Network Gateway (BNG) device to execute a security strategy for the UE responsive to determining the session establishment of the UE reaches the preset threshold, wherein the security strategy is used for stopping an attack behavior of the UE and informing the UE of the attack behavior of the UE;

wherein the method further comprises: accelerating, by the NAT device, aging of one or more sessions of the UE when the NAT device notifies the BNG device to execute the security strategy for the UE;
   wherein executing, by the BNG device, the security strategy for the UE comprises: executing, by the BNG device, a forced Web page pushing strategy for the UE to re-direct an Hypertext Transfer protocol (HTTP) request sent by the UE to a first prompt page, wherein the first prompt page is used for informing the UE of an existence of the attack behavior during an access of the UE;
   wherein after executing, by the BNG device, the security strategy for the UE, the method further comprises: notifying, by the NAT device, the BNG device to execute, aiming at an access behavior of the UE, an operation of forcing the UE to be offline or returning the UE to an unauthenticated state; and notifying, by the NAT device, an Authentication, Authorization and Accounting (AAA) server to mark or set the UE as a UE having the attack behavior, wherein the first prompt page is further used for reminding the UE that the UE is to be forced to be offline or returned to the unauthenticated state; responsive to the UE requesting to be online and/or to be authenticated again, authenticating, by the AAA server, the UE, after the UE passes the authentication by the AAA server, notifying, by the AAA server, the BNG device to execute a forced Web page pushing strategy for the UE to re-direct a page access request of the UE to a second prompt page, wherein the second prompt page is used for reminding the UE that a reason why the UE was formerly forced to be offline or returned to the unauthenticated state is the attack behavior of the UE and responsive to determining the UE still has the attack behavior, the UE will be forced to be offline or returned to the unauthenticated state again, and reminding the UE to check and kill viruses and/or Trojans.

2. The method according to claim 1, wherein re-directing, by the BNG device, the HTTP request sent by the UE to the first prompt page comprises:
   re-directing, by the BNG device, the HTTP request sent by the UE to the first prompt page at a preset interval.

3. The method according to claim 1, wherein the first prompt page is further used for reminding the UE to check or kill viruses and/or Trojans.

4. The method according to claim 1, wherein the NAT device comprises at least one of:
   an NAT device integrated with the BNG device; and
   an NAT device arranged separated from the BNG device.

5. The method according to claim 4, wherein in case the NAT device is integrated with the BNG device, notifying, by the NAT device, the BNG device to execute the security strategy for the UE comprises one of:
   sending, by the NAT device, identification information of the UE to a security strategy server, and notifying, by the security strategy server, the BNG device to execute the security strategy for the UE; and
   sending, by the NAT device, identification information of the UE to the BNG device to notify the BNG device to execute the security strategy for the UE.

6. The method according to claim 1, wherein after notifying, by the NAT device, the BNG device to execute the security strategy for the UE, the method further comprises:
   responsive to determining, by the NAT device, that the session establishment of the UE fails to reach the preset threshold or that the UE cancels execution of the security strategy via a forcedly pushed Web page, notifying, by the NAT device, the BNG device to cancel execution of the security strategy for the UE.

7. The method according to claim 6, wherein in case the NAT device is integrated with the BNG device, notifying, by the NAT device, the BNG device to cancel execution of the security strategy for the UE comprises one of:
   sending, by the NAT device, identification information of the UE to a security strategy server, and the security strategy server notifying the BNG device to cancel execution of the security strategy for the UE; and
   sending, by the NAT device, identification information of the UE to the BNG device to notify the BNG device to cancel execution of the security strategy for the UE.

8. The method according to claim 1, wherein in case the NAT device executes an operation of forcedly pushing a Web page in a public network aiming at access behavior of the UE, the NAT device establishes a session between the UE and an Hypertext Transfer protocol (HTTP) connection of the forcedly pushed Web page.

9. The method according to claim 1, wherein a session for the NAT device to determine whether or not the session establishment of the UE reaches the preset threshold comprises at least one of:
   a session established by a Transmission Control Protocol (TCP) connection of the UE;
   a session established by an Internet Control Message Protocol (ICMP) connection of the UE; and
   a session established by a User Datagram Protocol (UDP) connection of the UE.

10. The method according to claim 1, wherein the preset threshold comprises at least one of:
    a total number of sessions established by the UE, and a speed of establishing sessions by the UE.

11. A Network Address Translation (NAT) device, comprising:
    a hardware processor coupled with a memory and configured to execute program components stored on the memory, wherein the program components comprises:
    a determination component configured to determine whether or not a session establishment of a user equipment (UE) a reaches a preset threshold; and
    a first notification component configured to notify a Broadband Network Gateway (BNG) device to execute a security strategy for the UE responsive to determining the session establishment of the UE reaches the preset threshold, wherein the security strategy is used for stopping an attack behavior of the UE and informing the UE of the attack behavior of the UE;
    wherein the program components further comprise: a processing component configured to accelerate aging of one and more sessions of the UE when the NAT device notifies the BNG device to execute the security strategy for the UE,
    wherein the program components further comprise: a second notification component configured to notify the BNG device to execute, aiming at an access behavior of the UE, an operation of forcing the UE to be offline or returning the UE to an unauthenticated state and notify an Authentication, Authorization and Accounting (AAA) server to mark or set the UE as a UE having the attack behavior, wherein a first prompt page is further used for reminding the UE that the UE is to be forced to be offline or returned to the unauthenticated state so as to let the UE request to be online and/or to be authenticated again; the second notification component further configured to notify the BNG device to execute a forced Web page pushing strategy for the UE to re-direct a page access request of the UE to a second prompt page after the UE passes authentication executed by the AAA server, wherein the second prompt page is used for informing the UE that a reason why the UE was formerly forced to be offline or returned to the unauthenticated state is the attack behavior of the UE, and reminding the UE that the UE will be forced to be offline or returned to the unauthenticated state again responsive to determining the UE still has the attack behavior, and reminding the UE to check and kill viruses and/or Trojans.

12. The NAT device according to claim 11, wherein the program components further comprise: a third notification component configured to notify the BNG device to cancel execution of the security strategy for the UE responsive to determining that the session establishment of the UE fails to reach the preset threshold or that the UE cancels execution of the security strategy via a forcedly pushed Web page.

13. The NAT device according to claim 11, wherein the program components further comprise: a third notification component configured to notify the BNG device to cancel execution of the security strategy for the UE responsive to determining that the session establishment of the UE fails to reach the preset threshold or that the UE cancels execution of the security strategy via a forcedly pushed Web page.

14. A Broadband Network Gateway (BNG) device, comprising:
    a hardware processor coupled with a memory and configured to execute program components stored on the memory, wherein the program components comprises:
    a first receiving component configured to receive a first notification which is sent by a Network Address Translation (NAT) device to indicate execution of a security strategy for a user equipment (UE) when a session establishment of the UE reaches a preset threshold, the security strategy is used for stopping attack behavior of the UE and informing the UE of the attack behavior of the UE; and
    a re-direct component configured to execute a forced Web page pushing strategy for the UE to re-direct an Hypertext Transfer protocol (HTTP) request sent by the UE to a first prompt page, wherein the first prompt page is used for informing the UE of an existence of the attack behavior of the UE;
    wherein the program components further comprise: a second receiving component configured to receive a second notification which is sent by the NAT device to indicate execution of an operation of forcing the UE to be offline or returning the UE to an unauthenticated state aiming at an access behavior of the UE; and a processing component configured to execute, aiming at the access behavior of the UE, an operation of forcing the UE to be offline or returning the UE to the unauthenticated state according to the second notification and notify an Authentication, Authorization and Accounting (AAA) server to mark or set the UE as a UE having the attack behavior, wherein the first prompt page is further used for reminding the UE that the UE is to be forced to be offline or returned to the unauthenticated state so as to let the UE request to be online and/or to be authenticated again, the processing component further configured to execute a forced Web page pushing strategy for the UE to re-direct a page access request of the UE to a second prompt page when the BNG device is notified by the AAA server after the UE passes authentication executed by the AAA server, wherein the second prompt page reminding the UE that a reason why the UE was formerly forced to be offline or returned to the unauthenticated state is the attack behavior of the UE, and remind the UE that the UE will be forced to be offline or returned to the unauthenticated state again responsive to determining the UE still has the attack behavior, and remind the UE to check and kill viruses and/or Trojans.

* * * * *